(12) United States Patent
Lee et al.

(10) Patent No.: US 8,747,796 B2
(45) Date of Patent: Jun. 10, 2014

(54) METHOD OF PREPARING CARBON SUBSTRATE FOR GAS DIFFUSION LAYER OF POLYMER ELECTROLYTE FUEL CELL, CARBON SUBSTRATE PREPARED BY USING THE METHOD, AND SYSTEM FOR MANUFACTURING THE SAME

(75) Inventors: Chang Woo Lee, Gyeonggi (KR); Eun Sook Lee, Gyeonggi (KR); Jy Young Jyoung, Gyeonggi (KR); Do Hun Kim, Gyeonggi (KR); Yong Won Jin, Gyeonggi (KR); Jung Mi Gwak, Gyeonggi (KR); Young Uk Jyoung, Gyeonggi (KR)

(73) Assignee: Hyup Jin I&C Co., Ltd. (KR)

( * ) Notice: Subject to any disclaimer, the term of this patent is extended or adjusted under 35 U.S.C. 154(b) by 232 days.

(21) Appl. No.: 13/112,500

(22) Filed: May 20, 2011

(65) Prior Publication Data
US 2011/0286910 A1 Nov. 24, 2011

(30) Foreign Application Priority Data
May 20, 2010 (KR) .................. 10-2010-0047663

(51) Int. Cl.
*C01B 31/00* (2006.01)
*B28B 11/24* (2006.01)
*B29C 65/02* (2006.01)
*D04H 5/02* (2012.01)

(52) U.S. Cl.
USPC ........ 423/445 R; 156/148; 156/443; 264/29.6

(58) Field of Classification Search
USPC .................. 423/447.6, 445 R; 156/148, 443; 264/29.6
See application file for complete search history.

(56) References Cited

U.S. PATENT DOCUMENTS

2005/0150620 A1* 7/2005 Hamada et al. ............... 162/152
2008/0258206 A1 10/2008 Hofmann

FOREIGN PATENT DOCUMENTS

| CN | 1764752 A | 4/2006 |
| CN | 101330147 A | 12/2008 |
| CN | 101463578 A | 6/2009 |
| CN | 101591868 A | 12/2009 |
| JP | 6433082 A | 2/1989 |
| JP | 2004308098 A | 11/2004 |
| JP | 2007080742 A | 3/2007 |
| JP | 2010003564 A | 1/2010 |
| WO | 0156103 A1 | 8/2001 |

OTHER PUBLICATIONS

State Intellectual Property Office of the People's Republic of China Notification of the First Office Action Issued: Aug. 1, 2013 Application No. 201110238245.4 12 pages.

* cited by examiner

*Primary Examiner* — Daniel C McCracken
(74) *Attorney, Agent, or Firm* — St. Onge Steward Johnston & Reens LLC (57) ABSTRACT

A carbon substrate, method, and a system for manufacturing the same. The method includes forming an oxidized carbon precursor fiber preweb comprising oxidized carbon precursor staple fibers and binder staple fibers; impregnating the oxidized carbon precursor fiber preweb with a slurry including a thermosetting resin and carbonaceous fillers and drying the resulting preweb to obtain an oxidized carbon precursor fiber web; applying heat and pressure to the oxidized and impregnated carbon precursor fiber web, to cure the thermosetting resin and press the oxidized carbon precursor fiber web; and heating the oxidized carbon precursor fiber web in an inert atmosphere, thereby stabilizing and carbonizing the oxidized carbon precursor staple fibers to obtain a carbon substrate. The present invention may utilize a combination of carbon precursor staple fibers in an oxidized form with low ductility and high stiffness; and binder staple fibers composed of a polymer resin.

9 Claims, 9 Drawing Sheets

METHOD OF PREPARING CARBON SUBSTRATE FOR GAS DIFFUSION LAYER OF POLYMER ELECTROLYTE FUEL CELL, CARBON SUBSTRATE PREPARED BY USING THE METHOD, AND SYSTEM FOR MANUFACTURING THE SAME

CROSS-REFERENCE TO RELATED PATENT APPLICATION

This application claims the benefit of Korean Patent Application No. 10-2010-0047663, filed on May 20, 2010, in the Korean Intellectual Property Office, the disclosure of which is incorporated herein in its entirety by reference.

BACKGROUND OF THE INVENTION

1. Field of the Invention

The present invention relates to a method of preparing a carbon substrate for a gas diffusion layer of a polymer electrolyte type fuel cell, a carbon substrate prepared by using the method, and a system for manufacturing the same, and more particularly, to a method of preparing a carbon substrate for a gas diffusion layer of PEFCs by using carbon precursor staple fibers in an oxidized form and binder polymer staple fibers to skip an oxidation treatment process, thereby solving problems of deviation and low processability of a carbon substrate product and continuously forming a carbon substrate through a multi-step rolling curing process by using two or more press roll units to enhance the workability and maintain a uniform thickness of the carbon substrate; a carbon substrate thereby prepared; and a system for manufacturing the same.

The present invention is supported by the program of the Ministry of Knowledge Economy (Project No.: 2008NFC12J0125002008, leading institution: Hyupjin I&C, Co., Ltd., Research & Project Name: "Development of high performance, low cost GDL localization technology for hydrogen fuel cell automobile").

2. Description of the Related Art

Fuel cells are electrochemical devices which generate electrical energy through electrochemical reaction of fuel and oxygen, and may be classified into a polymer electrolyte membrane (PEM) type, a phosphoric acid type, a molten carbonate type, a solid oxide type, and an alkaline aqueous solution type according to the types of electrolyte used in the cells.

Among the various types of fuel cells, polymer electrolyte fuel cells (PEFCs) are characterized by lower operational temperatures, higher efficiency, higher current and power densities, shorter start-up time, and a more rapid response to changes in load than other types of fuel cells.

PEFCs may be classified into two types: direct methanol fuel cells which utilize methanol as a fuel and hydrogen fuel cells which utilize hydrogen as a fuel. PEFCs have a structure in which a plurality of membrane electrode assemblies (MEAs) are stacked. MEAs include a fuel electrode (anode) and an air electrode (cathode) facing each other; and an electrolyte membrane interposed between the two electrodes, wherein each of the fuel electrode and the air electrode includes a gas diffusion layer (GDL) to which catalyst particles applied. GDL is formed by coating a microporous layer (MPL) on a carbon substrate made of a porous carbon membrane.

Figure 1:
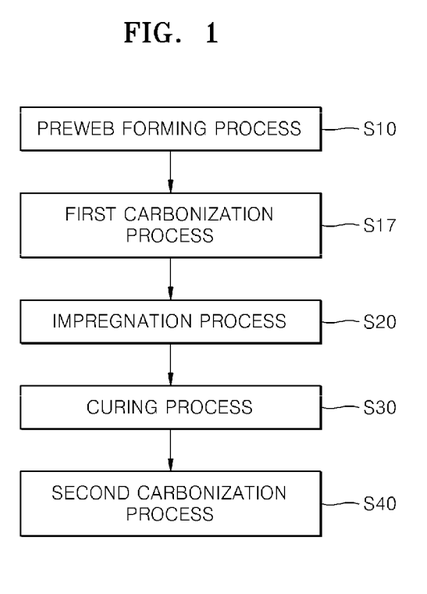
FIG. 1 is a flowchart schematically describing a method of preparing a carbon substrate according to a conventional technology.

As shown in FIG. 1, a method of preparing a carbon substrate constituting a gas diffusion layer according to a conventional technology includes a carbon precursor fiber preweb formation process S10 for forming a preweb (a carbon precursor fiber preweb) composed of carbon precursor staple fibers, a first carbonization process S17 for carbonizing the carbon precursor staple fibers of the preweb by heating the preweb in an inert atmosphere at high temperatures into carbon staple fibers, thereby forming a carbon fiber web, an impregnation process S20 for impregnating the carbon fiber web with a thermosetting resin and carbonaceous fillers, a curing process S30 for applying heat and pressure to the carbon fiber web in which the thermosetting resin and the carbonaceous fillers have been impregnated to cure the thermosetting resin, and a second carbonization process S40 for carbonizing the thermosetting resin and increasing the crystallinity of the carbon staple fibers by heating the cured carbon fiber web in an inert atmosphere at high temperatures, thereby obtaining the carbon substrate.

Figure 2:
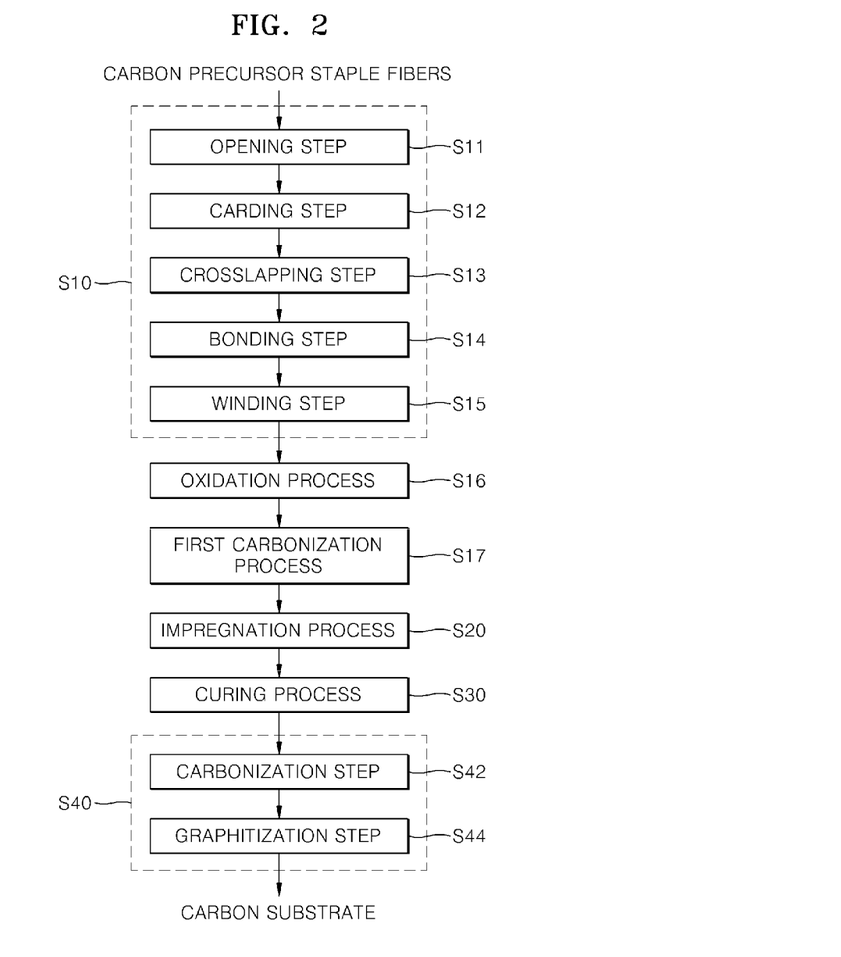
FIG. 2 is a flowchart illustrating in detail the method of preparing a carbon substrate constituting a gas diffusion layer according to a conventional technology shown in FIG. 1.

FIG. 2 illustrates in detail the method of preparing a carbon substrate constituting a gas diffusion layer according to a conventional technology shown in FIG. 1.

As shown in FIG. 2, in addition to the carbon precursor fiber preweb forming process S10, the first carbonization process S17, the impregnation process S20, the curing process S30, and the second carbonization process S40, the method of preparing a carbon substrate constituting a gas diffusion layer according to a conventional technology further includes an oxidation process S16 prior to the first carbonization process S17 for preliminarily oxidizing the carbon precursor staple fibers. The carbon precursor fiber web forming process S10 may include an opening step S11 for opening the carbon precursor staple fibers, a carding step S12 for carding the opened carbon precursor staple fibers to form a carded thin carbon precursor fiber preweb, a crosslapping step S13 for crosslapping the carded carbon precursor fiber prewebs to form a thick carbon precursor fiber preweb, a binding step S14 for binding the crosslapped thick carbon precursor fiber preweb to obtain a bound carbon precursor fiber preweb, and a winding step S15 for winding the bound carbon precursor fiber preweb, while the second carbonization process S40 may include a carbonization step S42 and a graphitization step S44.

Referring again to FIG. 2, an opening machine is used in the opening step S11 to loosen the lumps of carbon precursor staple fibers, such as poly acrylonitrile (PAN)-based staple fibers, pitch-based staple fibers, and the like and disentangle them. In the carding step S12, a carding machine is used to arrange the carbon precursor staple fibers in parallel and then collect them to form a thin carbon precursor fiber preweb in a sheet shape. In the crosslapping step S13, the thin carbon precursor fiber preweb discharged from the Carding MC is stacked into a plurality of layers to obtain a thick carbon precursor fiber preweb having a desired weight. Carbon precursor staple fibers are mechanically entangled with each other from the thus-crosslapped thick carbon precursor fiber preweb by needle-punching using a special needle in the binding step S14 to obtain a bound carbon precursor fiber preweb. The carbon precursor fiber preweb which has been subjected to the needle-punching is wound in the winding step S15. As described above, the thus-wound carbon precursor fiber preweb is subjected to an oxidation process S16 in an air atmosphere at about 200° C. to about 500° C. and then to a first carbonization process S17 to obtain a carbon fiber web. Subsequently, the web is subjected to an impregnation process S20, a curing process S30, and a second carbonization process S40 composed of a carbonization step S42 and a graphitization step S 44 to obtain a carbon substrate.

As described above, according to a conventional technology, since carbon precursor staple fibers in the unoxidized form, such as PAN-based staple fibers, pitch-based staple fibers, and the like are used, it is possible to use a general non-woven fabric production process as it is, a carbon substrate may be prepared only by carbon precursor staple fibers without a binder polymer and it is possible to control the surface properties of the carbon staple fibers. However, the conventional technology is disadvantageous in that the carbon substrate obtained may have deviations in thickness and weight by ±20%, mainly due to the use of the general non-woven fabric production process, and in that the carbon precursor fiber preweb may be easily elongated during the production process due to properties of carbon precursor staple fibers which are ductile and thus a deviation in its properties and thicknesses may easily occur.

In addition, when the conventional technology is used, additional process costs are generated because an oxidation process of a carbon precursor fiber preweb takes about 1 hour. Furthermore, the shrinkage rate of a carbon precursor fiber preweb and/or web may non-uniformly occur even at low elongation, and thus the preweb may be of different thicknesses at different sites. In particular, a deviation is significant in the cross-machine direction. In addition, because there is no binder or binder fiber in the oxidized carbon precursor fiber preweb, the preweb may be easily elongated non-uniformly in the machine direction (MD) and the cross-machine (CD). Thus, it is difficult to control resin impregnation and web thickness uniformly in the impregnation process. In addition, although the strength of carbon precursor staple fibers may be further increased by elongation and other mechanical properties thereof are enhanced, the staple fibers may not be elongated to have a sufficient strength because a polymer web is oxidized.

In the curing process S30 of the conventional technology, when a carbon precursor fiber web including a thermosetting resin and carbonaceous fillers is put between plates of a hot press heated to a curing temperature at a predetermined spacing and heat and pressure is applied thereto, the thickness of the carbon precursor fiber web is decreased while the thermosetting resin is cured. During the curing process S30, thermosetting polymer resins impregnated between carbon precursor staple fibers and carbon precursor staple fibers, between carbon precursor staple fibers and carbonaceous fillers, and between carbonaceous fillers and carbonaceous fillers are cured by heat and pressure and their molecular weights are increased to have a binding force.

In the curing process S30 usually used, a carbon precursor fiber web is put between two plates which have been heated to a curing temperature or more and pressed for a predetermined time to cure the thermosetting resin by using a hot press process. However, because a roll-shaped product may not be continuously prepared by this method, a technology disclosed in US laid-open patent No. 2008-0258206 allows a predetermined length of a carbon precursor fiber web to be supplied at a predetermined rate. Then, a hot press is used to press the carbon precursor fiber web for a predetermined time and transfer the fiber web again. Through a stamping operation of the repeated pressing and transferring, the carbon precursor fiber web is pressed into a predetermined thickness.

However, in the conventional method of preparing a carbon substrate, as described above, the curing process is conducted in such a manner that only a predetermined length of the carbon precursor fiber web is heat-pressed for a predetermined time. Thus, it is problematic in that the thickness of the carbon substrate is not easily controlled because the curing process is not continuously performed and the curing is not uniformly achieved. In addition, because the curing process is performed by a flat-plate hot pressing process, it is disadvantageous in that the curing of the binder polymer resin proceeds under a rigorous constraint of the flat-plate and thus the flexural strength of the resulting carbon substrate is very low. When the flexural strength is low, it is disadvantageous in that it is difficult to perform roll-winding and the carbon substrate may be easily broken even by a relatively weak force.

SUMMARY OF THE INVENTION

The present invention provides a method of preparing a carbon substrate for a gas diffusion layer for PEFCs capable of solving the deviation problems found in the conventional carbon substrate products and the above difficulties in the production process thereof while still using a typical non-woven fabric manufacturing process, a carbon substrate for a gas diffusion layer obtained by using the method, and a system for manufacturing the same, in order to solve the above-mentioned problems of conventional technology in which carbon precursor staple fibers which have not been oxidized are used to prepare a carbon substrate through the typical non-woven fabric manufacturing process.

The present invention also provides a carbon substrate for a gas diffusion layer of PEFCs to allow production of a carbon substrate to be continuously performed through a multi-step rolling curing process by two or more press roll units and to enhance its production productivity, and a preparation method thereof and a preparation system thereof, in order to solve problems of the low productivity of a carbon substrate production and the pressing and curing being not uniformly obtained because the curing process in the conventional technology is performed by a non-continuous stamping process.

The present invention also provides a method of preparing a carbon substrate for a gas diffusion layer of PEFCs prepared as a roll-state product with a flexible structure, a carbon substrate for a gas diffusion layer prepared by using the preparation method, and a system for manufacturing the same.

The present invention also provides a method of preparing a carbon substrate for a gas diffusion layer of PEFCs capable of reducing thickness deviations at different sites of the carbon substrate, the deviations being produced from a flat plate-type press curing, a carbon substrate for a gas diffusion layer obtained by using the preparation method, and a system for manufacturing the same.

In a method of preparing a carbon substrate for a gas diffusion layer of PEFCs according to an aspect of the present invention, as the carbon precursor staple fibers in an oxidized form, at least one selected from the group consisting of oxidized polyacrylonitrile (Oxy-PAN)-based staple fibers, oxidized pitch (Oxy-pitch)-based staple fibers, oxidized cellulose (Oxy-cellulose)-based staple fibers and oxidized phenolic resin-based staple fibers may be used. As the binder staple fibers, at least one selected from the group consisting of polyvinyl alcohol (PVA) staple fibers, low melting point (LM) polyester staple fibers, polyethylene (PE) staple fibers, polypropylene (PP) staple fibers, cellulose staple fibers, and pitch staple fibers may be used. In addition, a typical non-woven fabric manufacturing process may be used, and an oxidation treatment process is skipped.

In a method of preparing a carbon substrate for a gas diffusion layer of PEFCs according to an aspect of the present invention, a curing process of a carbon precursor fiber web is performed through a multi-step rolling curing process by two or more press roll unit.

A multi-step rolling curing device of a system for preparing a carbon substrate for a gas diffusion layer of PEFCs according to the present invention includes a preheating unit for preheating an oxidized carbon precursor fiber web which has been impregnated with the thermosetting resin and the carbonaceous fillers, a rolling curing unit for performing a heat-press curing in two or more stages on the oxidized carbon precursor fiber web preheated by the preheating unit, and a cooling unit for cooling the oxidized carbon precursor fiber web which has been pressed and cured by the rolling curing unit.

According to a specific embodiment of the present invention, there is provided a method of preparing a carbon substrate for a gas diffusion layer of PEFCs, including an oxidized carbon precursor fiber preweb forming process S10 for forming a preweb (oxidized carbon precursor fiber preweb) 512 including oxidized carbon precursor staple fibers and binder staple fibers, such as PVA staple fibers, LM polyester staple fibers, and the like; an impregnation process S20 for impregnating the oxidized carbon precursor fiber preweb 512 with a slurry 520 including a thermosetting resin and carbonaceous fillers and drying the resulting preweb 512 to obtain an oxidized carbon precursor fiber web 510; a curing process S30 for applying heat and pressure to the oxidized carbon precursor fiber web 510, which has been impregnated with the thermosetting resin and the carbonaceous fillers, to cure the thermosetting resin and press the web; and a carbonization process S41 for heating the oxidized carbon precursor fiber web 510 in an inert atmosphere in a carbonization furnace, thereby stabilizing and carbonizing the oxidized carbon precursor staple fibers to obtain a carbon substrate.

The oxidized carbon precursor fiber preweb forming process S10 may include an opening step S11' for uniformly mixing and loosening the lumps of oxidized carbon precursor staple fibers and the lumps of binder staple fibers, and disentangling them by using an opening machine; a carding step S12' for arranging the oxidized carbon precursor staple fibers and the binder staple fibers in parallel and collect them to form an oxidized carbon precursor fiber preweb in a sheet shape by using a carding machine; a cross-lapping step S13' for stacking the oxidized carbon precursor fiber preweb discharged from the carding machine into a plurality of layers to obtain a thicker oxidized carbon precursor fiber preweb with a desired weight; a bonding step S14' for allowing the oxidized carbon precursor staple fibers and the binder staple fibers to be mechanically entangled with each other by needle-punching using a special needle to bind the oxidized carbon precursor fiber preweb; a heat-pressing step S45 for heat-pressing the oxidized carbon precursor fiber preweb thus-bound by calendaring the preweb; and a winding step S15' for winding the oxidized carbon precursor fiber preweb.

The oxidized carbon precursor fiber preweb forming process S10 may further include a mixing treatment step for mixing the oxidized carbon precursor staple fibers with the binder staple fibers, prior to the opening step S11'.

The binder staple fibers may be present in an amount of about 1 to about 30% by weight based on a weight of the preweb, more preferably about 1 to about 10% by weight, and may be a thermoplastic polymer staple fiber with a melting point of about 300° C. or less, for example, 50° C. or more and 300° C. or less.

The lengths of the oxidized carbon precursor staple fibers and the binder staple fibers may be in the range of about 10 mm to about 100 mm, for example, about 20 mm to about 80 mm or about 30 mm to about 50 mm.

As the impregnation process S20 may be performed in the same manner as in the conventional technology described above, the detailed description about the process is skipped.

The curing process S30 may be performed by a multi-step rolling curing process S300 including a preheating step, a heat-press curing step, and a cooling step. The curing process S30 including a multi-step rolling curing process S300 may be performed by a preheating process S31 for preheating the oxidized carbon precursor fiber web, which has been impregnated with the thermosetting resin and the carbonaceous fillers, while it is being transferred at about 100° C. to about 150° C.; a continuous rolling curing process S32 for pressing and curing the oxidized carbon precursor fiber web 510, while it is being transferred, at about 130° C. to about 250° C., by a rolling curing unit 312 having two or more pairs of press rolls whose rolling gaps formed to be progressively narrowed in the transfer direction of the oxidized carbon precursor fiber we 510b; and a cooling process S33 for air-cooling the oxidized carbon precursor fiber web 510 which has been pressed and cured to a predetermined thickness through the continuous rolling curing process S32.

The preheating process S31 may be performed by sequential heating including two or more different stages, for example, two or more and four or less stages, and specifically two or more and three or less stages, at about 100° C. to about 150° C.

In the continuous rolling curing process S32, the oxidized carbon precursor fiber web 510, which has been impregnated with the thermosetting resin and the carbonaceous fillers, and preheated through the preheating process S31, is heated and pressed in the rolling curing unit 312, where the oxidized carbon precursor fiber web 510 may be heated and pressed while continuously passing through at least two pairs of press rolls of the rolling curing unit in a manner in which the web 510 passes through rolls of a first pair of rolls (a first roll unit) having a gap of about 300 μm to about 1000 μm at about 130° C. to about 250° C., subsequently passes through rolls of a second pair of rolls (a second roll unit) having a gap of about 250 μm to about 600 μm at about 130° C. to about 250° C., and then passes through rolls of a $n^{th}$ pair of rolls (an $n^{th}$ roll unit, n is a natural number of 3 or more and 10 or less) having a gap of about 200 μm to about 400 μm at about 130° C. to about 250° C.

The rolling curing unit 312 may have a roll radius of preferably about 100 mm to about 800 mm, and more preferably about 150 mm to about 500 mm. The first roll unit to the $n^{th}$ roll unit may be maintained at an identical temperature. Alternatively, the temperature may be progressively increased in a direction from the first roll unit to the $n^{th}$ roll unit.

Figure 6:
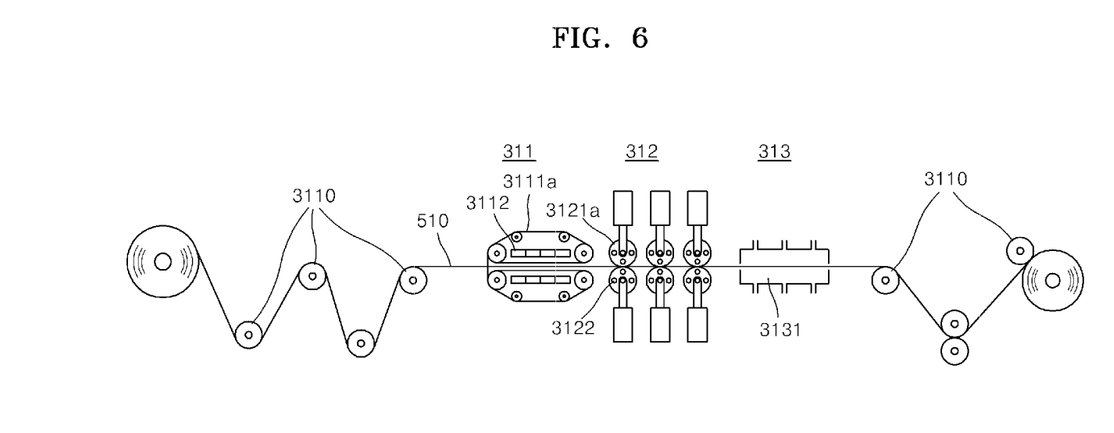
FIG. 6 is an exemplary structural view of a system for manufacturing a carbon substrate according to an embodiment of the present invention.
Figure 7:
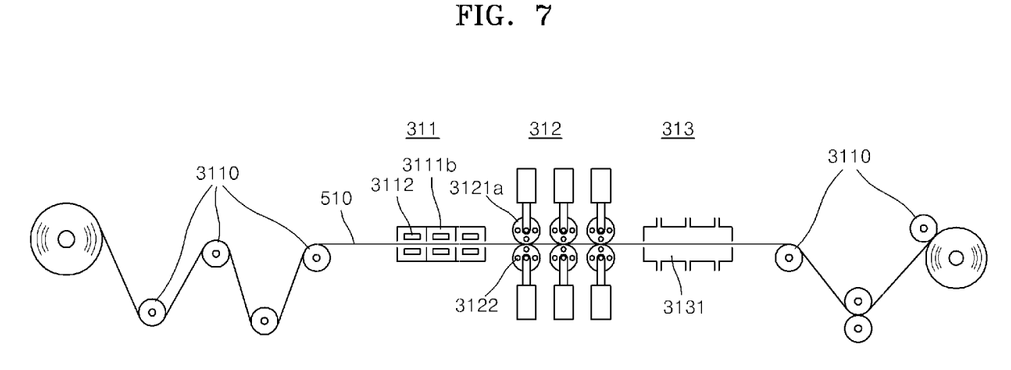
FIG. 7 is an exemplary structural view of a system for manufacturing a carbon substrate according to another embodiment of the present invention.
Figure 8:
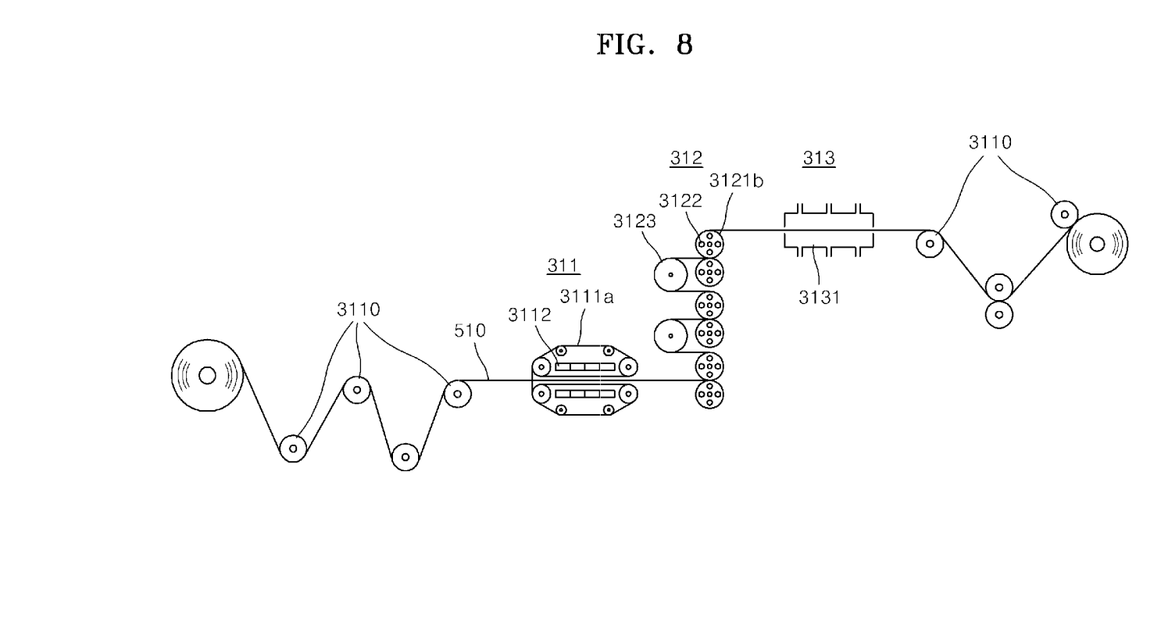
FIG. 8 is an exemplary structural view of a system for manufacturing a carbon substrate according to a still another embodiment of the present invention.

As shown in FIGS. 6 and 7, each pair of rolls (press roll unit 3121a) in the rolling curing unit 312 may be horizontally arranged. Alternatively, as shown in FIG. 8, each pair of rolls (press roll unit 3121b) may be vertically arranged. In this case, a guide roll 3123 may be provided between the two press roll unit 3121b vertically mounted.

The cooling process S33 may be performed in a manner in which the oxidized carbon precursor fiber web 510 heated in the continuous rolling curing process S32 may be slowly cooled through two or more different stages, and may be sequentially cooled at a temperature of, for example, two or more and four or less stages, and specifically, two or more and 3 or less stages. The oxidized carbon precursor fiber web 510 which has been pressed and cured to a predetermined thickness through the continuous rolling curing process S32 may be air-cooled in the cooling process S33.

The carbonization process S41 may be performed by a carbonization step S42 for heating the oxidized carbon precursor fiber web 510 in an inert atmosphere at about 600° C. to about 1000° C. to carbonize the oxidized carbon precursor staple fibers, the thermosetting resin, and the binder staple fibers; and a graphitization step S42 for further heating the carbonized web 510 in an inert atmosphere at about 1300° C.

to about 2000° C. to form a graphite structure in the carbon fibers which has been formed by the carbonization.

The oxidized carbon precursor staple fibers may be at least one selected from the group consisting of oxidized PAN-based staple fibers, oxidized pitch-based staple fibers, oxidized PVA-based staple fibers, oxidized cellulose-based staple fibers, and oxidized phenolic resin-based staple fibers, and the binder staple fibers may be at least one selected from the group consisting of PVA staple fibers, LM polyester staple fibers, PE staple fibers, PP staple fibers, cellulose staple fibers, and pitch staple fibers.

According to another aspect of the present invention, there is provided a carbon substrate for a gas diffusion layer of PEFCs prepared by the method of preparing a carbon substrate for a gas diffusion layer of PEFCs.

According to a still another aspect of the present invention, there is provided a system for manufacturing a carbon substrate for a gas diffusion layer of PEFCs, including a preweb forming device (not shown) for forming an oxidized carbon precursor fiber preweb 512 including oxidized carbon precursor staple fibers and binder staple fibers; an impregnation device 210 for impregnating the preweb 512 with a slurry including a thermosetting resin and carbonaceous fillers and drying the resulting preweb 512 to prepare an oxidized carbon precursor fiber web 510; a curing device 310 for applying heat and pressure to the oxidized carbon precursor fiber web 510 which has been impregnated with the thermosetting resin and the carbonaceous fillers to cure the thermosetting resin and press the web 510; and a carbonization device 410 including a carbonization furnace for heating the oxidized carbon precursor fiber web 510 in an inert atmosphere, thereby stabilizing and carbonizing the oxidized carbon precursor staple fibers to obtain a carbon substrate.

The preweb forming device may further include a mixer for mixing the carbon precursor staple fibers with the binder staple fibers.

The preweb forming device may include an opening machine for uniformly mixing and loosening the lumps of entangled oxidized carbon precursor staple fibers and the lumps of entangled binder staple fibers and disentangling them;
a carding machine for arranging the oxidized carbon precursor staple fibers and the binder staple fibers in parallel and collecting them to form an oxidized carbon precursor fiber preweb in a sheet shape; a crosslapping machine for stacking the oxidized carbon precursor fiber preweb discharged from the carding machine into a plurality of layers to produce an oxidized carbon precursor fiber preweb with a desired weight; a needle-punching machine for mechanically entangling the oxidized carbon precursor staple fibers and the binder staple fibers with each other from the thus-crosslapped thicker oxidized carbon precursor fiber preweb by needle-punching using a special needle to prepare a thus-bound oxidized carbon precursor fiber preweb; a calendaring machine for heating and pressing the oxidized carbon precursor fiber preweb which has been bound; and a winding machine for winding the oxidized carbon precursor fiber preweb.

The curing device 310 may be a multi-step rolling curing device 310 for sequentially performing a preheating step, a heat-press curing step, and a cooling step.

The curing device 310 for performing the multi-step rolling curing process S300 may include a preheating unit 311 for preheating the oxidized carbon precursor fiber web 510, which has been impregnated with the thermosetting resin and the carbonaceous fillers, while it is being transferred at about 100° C. to about 150° C.; a rolling curing unit 312 having two or more pairs of rolls whose rolling gaps formed to be progressively narrowed in the transfer direction of the oxidized carbon precursor fiber web in order to transfer, press and cure the oxidized carbon precursor fiber web 510, which has been preheated by the preheating unit 311, at 130° C. to 250° C.; and a cooling unit 313 for air-cooling the oxidized carbon precursor fiber web 510 which has been pressed and cured to a predetermined thickness by the rolling curing unit 312.

Preferably, as illustrated in FIG. 6, the preheating unit 311 includes a heating belt 3111a which is installed on and under the oxidized carbon precursor fiber web, which has been impregnated with the thermosetting resin and the carbonaceous fillers, and rotates in the transfer direction of the web 510, and two or more pre-heaters 3112 which are installed in the heating belt 3111a and heat the heating belt 3111a to allow the web 510 to be progressively heated in the transfer direction.

Alternatively, as illustrated in FIG. 7, the preheating unit 311 is formed to enclose the web 510 while it is being transferred and includes two or more heating chambers 3111b which are sectioned in the transfer direction of the web 510 to progressively heat the web 510 and respective pre-heaters 3112 provided in the heating chambers 3111b.

Preferably, the rolling curing unit 312 includes two or more press roll units 3121a with each press roll unit 3121a including a pair of rolls, each pair of rolls disposed to face each other on and under the web 510. In this embodiment, the two or more press roll units 3121a are horizontally arranged, and roll heaters 3122 are installed on at least one side of the inner and outer sides of the rolls of the press roll unit 3121a. The heating temperatures of the two or more press roll units 3121a may be set to be progressively increased in the transfer direction of the web 510, and the gaps between each pair of upper and lower rolls in the two or more press roll units 3121a may be set to be progressively narrowed in the transfer direction of the web 510. By this, the web 510 is pressed and cured to a predetermined thickness while continuously passing through the two or more press roll units 3121a of the rolling curing unit 312.

Alternatively, as illustrated in FIG. 8, the rolling curing unit 312 may comprise two or more press roll units 3121b with each press roll unit including a pair of rolls, each pair of rolls disposed to face each other on both sides of the oxidized carbon precursor fiber web 510 in order to transfer, press and cure the web. In this embodiment, the two or more press roll units 3121b are vertically arranged. A guide roll 3123 is provided between the two press roll units 3121b to guide the web 510 to the next press roll unit 3121b, roll heaters 3122 are provided on at least one side of the inner and outer sides of the rolls of the press roll unit 3121b, the heating temperatures of the two or more press roll units 3121b may be set to be progressively increased in the transfer direction of the web 510, and the gaps between each pair of upper and lower rolls in the two or more press roll units 3121b may be set to be progressively narrowed in the transfer direction of the web 510. By this, the web 510 is pressed and cured to a predetermined thickness while continuously passing through the two or more press roll units 3121b of the rolling curing unit 312.

Preferably, the roll radius of the rolling curing unit 312 may be in the range of about 100 mm to about 800 mm, and more preferably, in the range of about 150 mm to about 500 mm. The first roll unit to the $n^{th}$ roll unit may be maintained at an identical temperature. Alternatively, the temperature may be progressively increased in a direction from the first roll unit to the $n^{th}$ roll unit.

Preferably, as illustrated in FIGS. 6-8, the cooling unit 313 includes two or more cooling chambers 3131, each separately disposed in the transfer direction of the web 510, and the cooling chambers 3131 are configured to allow each cooling air to be supplied and thus the heated web 510 is slowly cooled while passing each cooling chamber 3131.

Preferably, the carbonization device 410 may include a carbonization furnace for carbonizing oxidized carbon precursor staple fibers, a thermosetting resin, and binder staple fibers of the oxidized carbon precursor fiber web 510 in an inert atmosphere at about 600° C. to about 1000° C.; and a graphitization furnace for further heating the carbonized web 510 under an inert atmosphere at about 1300° C. to about 2000° C. to form a graphite structure in carbonized carbon fibers which have been formed by the carbonization.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a method of preparing a carbon substrate for a gas diffusion layer of PEFCs according to preferred embodiments of the present invention and a system for manufacturing the same will be described in more detail with reference to accompanying drawings.

Figure 3:
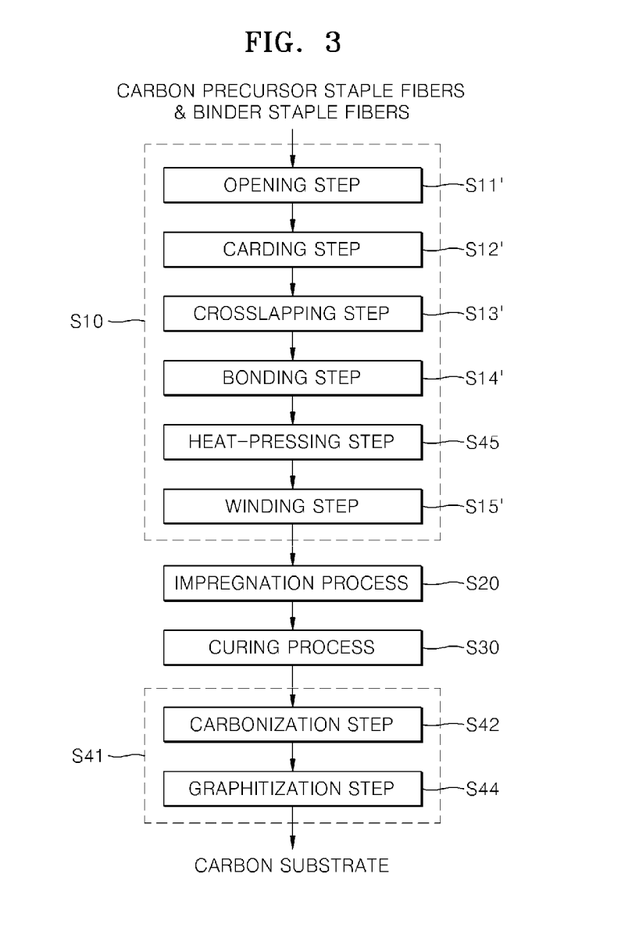
FIG. 3 is a detailed flowchart of a method of preparing a carbon substrate of an aspect of the present invention.
Figure 4:
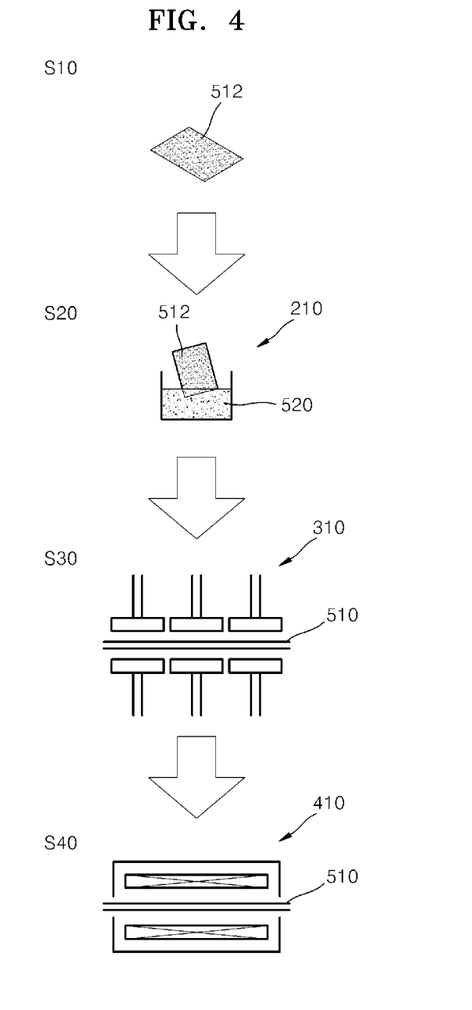
FIG. 4 is a process flowchart of a method of preparing a carbon substrate of an embodiment of the present invention.

FIG. 3 is a detailed flowchart of a method of preparing a carbon substrate of an aspect of the present invention, and FIG. 4 is a process flowchart of a method of preparing a carbon substrate of an embodiment of the present invention.

Referring to FIGS. 3, and 4, a carbon substrate for a gas diffusion layer of PEFCs of the present invention may be prepared by using a typical non-woven fabric manufacturing process by using at least one selected from the group consisting of oxidized PAN-based staple fibers, oxidized pitch-based staple fibers, oxidized PVA-based staple fibers, oxidized cellulose-based staple fibers, and oxidized phenolic resin-based staple fibers as carbon precursor staple fibers and at least one selected from the group consisting of PVA staple fibers, LM polyester staple fibers, PE staple fibers, PP staple fibers, cellulose staple fibers, and pitch staple fibers as binder staple fibers. However, carbon precursor staple fibers in the oxidized form are used as carbon precursor staple fibers, and thus an oxidation treatment process is skipped.

The lengths of the oxidized carbon precursor staple fibers and the binder staple fibers may be in the range of about 10 mm to about 100 mm, for example, about 20 mm to about 80 mm or about 30 mm to about 50 mm.

A method of preparing a carbon substrate according to the present embodiment includes an oxidized carbon precursor fiber preweb forming process S10 for forming a preweb (oxidized carbon precursor fiber preweb) 512 including oxidized carbon precursor staple fibers and binder staple fibers, such as PVA staple fibers, LM polyester staple fibers, and the like; an impregnation process S20 for impregnating the oxidized carbon precursor fiber preweb 512 with a slurry 520 including a thermosetting resin and carbonaceous fillers and drying the resulting preweb 512 to obtain an oxidized carbon precursor fiber web 510; a curing process S30 for applying heat and pressure to the oxidized carbon precursor fiber web 510, which has been impregnated with the thermosetting resin and the carbonaceous fillers, to cure the thermosetting resin and press the web 510; and a carbonization process S41 for heating the oxidized carbon precursor fiber web 510 in an inert atmosphere in a carbonization furnace, thereby stabilizing and carbonizing the oxidized carbon precursor staple fibers to obtain a carbon substrate.

The oxidized carbon precursor fiber preweb forming process S10 may include an opening step S11' for uniformly mixing and loosening the lumps of oxidized carbon precursor staple fibers and the lumps of binder staple fibers, and disentangling them by using an opening machine; a carding step S12' for arranging the oxidized carbon precursor staple fibers and the binder staple fibers in parallel and collect them to form an oxidized carbon precursor fiber preweb in a sheet shape by using a carding machine; a cross-lapping step S13' for stacking the oxidized carbon precursor fiber preweb discharged from the carding machine into a plurality of layers to obtain a thicker oxidized carbon precursor fiber preweb with a desired weight; a bonding step S14' for allowing the oxidized carbon precursor staple fibers and the binder staple fibers to be mechanically entangled with each other by needle-punching using a special needle to bind the oxidized carbon precursor fiber preweb; a heat-pressing step S45 for heat-pressing the oxidized carbon precursor fiber preweb thus-bound by calendaring the preweb; and a winding step S15' for winding the oxidized carbon precursor fiber preweb.

The oxidized carbon precursor fiber preweb forming process S10 may further include a mixing treatment step for mixing the oxidized carbon precursor staple fibers with the binder staple fibers, prior to the opening step S11'.

The binder staple fibers may be present in an amount of about 1 to about 30% by weight based on a weight of the preweb, more preferably about 1 to about 10% by weight, and may be a thermoplastic polymer staple fiber with a melting point of about 300° C. or less, for example, 50° C. or more and 300° C. or less.

As the impregnation process S20 may be performed in the same manner as in the conventional technology described above, a detailed description thereof will be omitted here.

The curing process S30 is a process for applying heat and pressure to the oxidized carbon precursor fiber web 510, which has been impregnated with the thermosetting resin and the carbonaceous fillers, to cure the thermosetting resin and press the oxidized carbon precursor fiber web 510. This process may be performed by a multi-step rolling curing process S300 including a preheating step, a heat-press curing step, and a cooling step.

The carbonization process S41 may be performed by a carbonization step S42 for heating an oxidized carbon precursor fiber web 510 in an inert atmosphere at about 600° C. to about 1000° C. to carbonize the oxidized carbon precursor staple fibers, the thermosetting resin, and the binder staple fibers; and a graphitization step S44 for further heating the carbonized web 510 in an inert atmosphere at about 1300° C. to about 2000° C. to form a graphite structure in the carbon fibers which has been formed by the carbonization.

Figure 5:
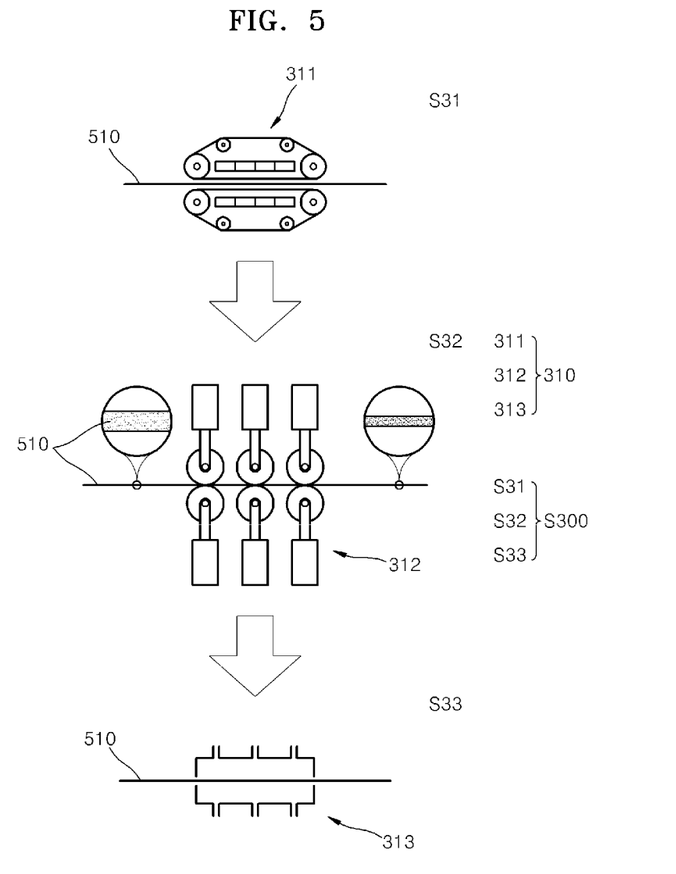
FIG. 5 is a detailed process flowchart of a curing process and a curing device used in a method of preparing a carbon substrate according to an embodiment of the present invention.

The multi-step rolling curing process S300 will be described in detail with a reference to FIG. 5. FIG. 5 is a detailed process flowchart of a curing process and a curing device used in a method of preparing a carbon substrate according to an embodiment of the present invention.

Referring to FIG. 5, the curing process S30 including a multi-step rolling curing process S300 may be performed by a preheating process S31 for preheating the oxidized carbon precursor fiber web 510, which has been impregnated with the thermosetting resin and the carbonaceous fillers, while it is being transferred, at about 100° C. to about 150° C.; a continuous rolling curing process S32 for pressing and curing the oxidized carbon precursor fiber web 510, while it is being transferred, preheated through the preheating process S31 at about 130° C. to about 250° C. by a rolling curing unit 312 having two or more pairs of rolls whose rolling gaps formed to be progressively narrowed in the transfer direction of the oxidized carbon precursor fiber web 510; and a cooling process S33 for air-cooling the oxidized carbon precursor fiber web 510 pressed and cured to a predetermined thickness through the continuous rolling curing process S32.

Preferred embodiments of the present invention implementing the multi-step rolling curing process S300 in FIG. 5 will be described in more detail with reference to FIGS. 6 to 8.

FIG. 6 is an exemplary structural view of a system for manufacturing a carbon substrate according to an embodiment of the present invention, FIG. 7 is an exemplary structural view of a system for manufacturing a carbon substrate according to another embodiment of the present invention, and FIG. 8 is an exemplary structural view of a system for manufacturing a carbon substrate according to a still another embodiment of the present invention.

The preheating process S31, which is a first process, is implemented by a preheating unit 311 configured to perform sequential heating at two or more different temperatures within the range of about 100° C. to about 150° C. According to FIGS. 6 and 8, the preheating unit 311 includes a heating belt 3111a which is installed on and under the oxidized carbon precursor fiber web 510, which has been impregnated with the thermosetting resin and the carbonaceous fillers, and rotates in the transfer direction of the oxidized carbon precursor fiber web 510, and two or more pre-heaters 3112 which are installed in the heating belt 3111a and heat the heating belt 3111a to allow the oxidized carbon precursor fiber web 510 to be progressively heated in the transfer direction. Then, the oxidized carbon precursor fiber web 510 is pressed at a pressure of about 1 to about 10 kgf/cm² by the heating belt 3111a.

Alternatively, referring to FIG. 7, the preheating unit 311 is formed to enclose the oxidized carbon precursor fiber web 510 while it is being transferred and includes two or more heating chambers 3111b which are sectioned in the transfer direction of the web 510 to progressively heat the oxidized carbon precursor fiber web 510 and respective pre-heaters 3112 provided in the heating chambers 3111b.

In the continuous rolling curing process, which is a second process, the rate of press applied on the oxidized carbon precursor fiber web 510 is sequentially increased and the heating temperature applied to the oxidized carbon precursor fiber web 510 is also sequentially increased at more than two different stages to perform the curing process uniformly.

The oxidized carbon precursor fiber web 510 which has been preheated through the preheating process S31 is heated and pressed while continuously passing through at least two rolling curing units in a manner in which the oxidized carbon precursor fiber web 510 passes through a first pair of rolls having a gap of about 300 μm to about 1000 μm at about 130° C. to about 250° C., continuously passes through a second pair of rolls having a gap of about 250 μm to about 600 μm at about 130° C. to about 250° C., and then passes through rolls of an $n^{th}$ roll unit having a gap of about 200 μm to about 400 μm at about 130° C. to about 250° C.

Here, the roll radius of the rolling curing unit 312 may be in the range of about 100 mm to about 800 mm, and more preferably, in the range of about 150 mm to about 500 mm, and the temperature of the rolls may be identical from the $1^{st}$ roll unit to the $n^{th}$ roll unit, or may be progressively increased from the $1^{st}$ roll unit to the $n^{th}$ roll unit.

The roll may be heated by induction heating or by heating using a heating medium to be maintained at a temperature of about 130° C. to about 250° C., and more preferably, the roll may be maintained at a temperature of about 150° C. to about 200° C.

As shown in FIGS. 6 and 7, each pair of rolls (press roll unit 3121a) in the rolling curing unit 312 may be horizontally arranged. Alternatively, as shown in FIG. 8, each pair of rolls (press roll unit 3121b) may be vertically arranged. In this case, a guide roll 3123 may be provided between the two press roll units 3121b vertically mounted.

In the cooling process S33, which is as a third process, the oxidized carbon precursor fiber web 510 heated in the continuous rolling curing process S32 is sequentially cooled at more than two different stage temperatures to be slowly cooled. The oxidized carbon precursor fiber web 510 pressed and cured to a predetermined thickness through the continuous rolling curing process S32 may be air-cooled during this step. Although a method of cooling the oxidized carbon precursor fiber web 510 may be performed by controlling the flow rate of cooling air, other gases which are not capable of inducing any reaction may be used.

A guide roll 3110 may be positioned between each process unit to serve as a guide to allow the oxidized carbon precursor fiber web 510 to proceed, and the radius of the guide roll 3110 is determined to allow the pressed and cured web 510 to be continuously rolled without being disconnected.

Hereinafter, a system for manufacturing a carbon substrate for a gas diffusion layer of PEFCs according to another aspect of the present invention will be described in more detail with reference to accompanying drawings.

Referring to FIG. 4, a system for manufacturing a carbon substrate for a gas diffusion layer of PEFCs includes a preweb forming device for forming an oxidized carbon precursor fiber preweb 512 including oxidized carbon precursor staple fibers and binder staple fibers; an impregnation device 210 for impregnating the preweb 512 with a slurry including a thermosetting resin and carbonaceous fillers and drying the resulting preweb 512 to prepare an oxidized carbon precursor fiber web 510; a curing device 310 for applying heat and pressure to the oxidized carbon precursor fiber web 510 which has been impregnated with the thermosetting resin and the carbonaceous fillers to cure the thermosetting resin and press the oxidized carbon precursor fiber web 510; and a carbonization device 410 including a carbonization furnace (not shown) for heating the oxidized carbon precursor fiber web 510 in an inert atmosphere, thereby stabilizing and carbonizing the oxidized carbon precursor staple fibers to produce a carbon substrate.

The preweb forming device may further include a mixer for mixing the carbon precursor staple fibers with the binder staple fibers.

The preweb forming device includes an opening machine for uniformly mixing and loosening the lumps of entangled oxidized carbon precursor staple fibers and the lumps of entangled binder staple fibers and disentangling them; a carding machine for arranging the oxidized carbon precursor staple fibers and the binder staple fibers in parallel and collecting them to form an oxidized carbon precursor fiber preweb in a sheet shape; a crosslapping machine for stacking the oxidized carbon precursor fiber preweb discharged from the carding machine into a plurality of layers to produce an oxidized carbon precursor fiber preweb with a desired weight; a needle-punching machine for mechanically entangling the oxidized carbon precursor staple fibers and the binder staple fibers with each other from the thus-crosslapped carbon precursor fiber preweb by needle-punching using a special needle to prepare an oxidized carbon precursor fiber preweb thus-bound; a calendaring machine for heating and pressing the oxidized carbon precursor fiber preweb which has been bound; and a winding machine for winding the oxidized carbon precursor fiber preweb.

In the system for manufacturing a carbon substrate for a gas diffusion layer of PEFCs according to an embodiment of the present invention, the curing device 310, as shown in FIG. 5, includes a multi-step rolling curing device 310 for sequentially performing a preheating step, a heat-press curing step, and a cooling step.

Here, the curing device 310 for performing the multi-step rolling curing process S300, as shown in FIG. 5, includes a preheating unit 311 for preheating the oxidized carbon precursor fiber web 510, which has been impregnated with the thermosetting resin and the carbonaceous fillers, while it is being transferred, at about 100° C. to about 150° C.; a rolling curing unit 312 having two or more pairs of press rolls whose rolling gaps formed to be progressively narrowed in the transfer direction of the oxidized carbon precursor fiber web in order to transfer, press and cure the oxidized carbon precursor fiber web 510 preheated by the preheating unit 311 at about 130° C. to about 250° C.; and a cooling unit 313 for air-cooling the oxidized carbon precursor fiber web 510 which has been pressed and cured to a predetermined thickness by the rolling curing unit 312.

Referring to FIGS. 6 and 8, the preheating unit 311 includes a heating belt 3111*a* which is installed on and under the oxidized carbon precursor fiber web, which has been impregnated with the thermosetting resin and the carbonaceous fillers, and rotates in the transfer direction of the web 510, and two or more pre-heaters 3112 which are installed in the heating belt 3111*a* and heat the heating belt 3111*a* to allow the oxidized carbon precursor fiber web 510 to be progressively heated in the transfer direction.

Alternatively, as illustrated in FIG. 7, the preheating unit 311 is formed to enclose the oxidized carbon precursor fiber web 510 while it is being transferred and includes two or more heating chambers 3111*b* which are sectioned in the transfer direction of the web 510 to progressively heat the oxidized carbon precursor fiber web 510 and respective pre-heaters 3112 provided in the heating chambers 3111*b*.

As shown in FIGS. 6 and 7, the rolling curing unit 312 includes two or more press roll units 3121*a* with each press roll unit 3121*a* including a pair of rolls, each pair of rolls disposed to face each other on and under the oxidized carbon precursor fiber web 510 while it is being transferred. In this embodiment, the two or more press roll units 3121*a* are horizontally arranged, and roll heaters 3122 are installed on at least one side of the inner and outer sides of the rolls of the press roll unit 3121*a*. The heating temperatures of the two or more press roll unit 3121*a* may be set to be progressively increased in the transfer direction of the oxidized carbon precursor fiber web 510, and the gaps between each pair of upper and lower rolls in the two or more press roll units 3121*a* may be set to be progressively narrowed in the transfer direction of the web 510. By this, the web 510 is pressed and cured to a predetermined thickness while continuously passing through the two or more press roll units 3121*a* of the rolling curing unit 312.

Alternatively, as illustrated in FIG. 8, the rolling curing unit 312 comprises two or more press roll units 3121*b* with each press roll unit including a pair of rolls, each pair of rolls disposed to face each other on both sides of the oxidized carbon precursor fiber web 510 in order to transfer, press and cure the web. In this embodiment, the two or more press roll units 3121*b* are vertically arranged. A guide roll 3123 is provided between the two press roll units 3121*b* to guide the web 510 to the next press roll unit 3121*b*, roll heaters 3122 are provided on at least one side of the inner and outer sides of the rolls of the press roll unit 3121*b*, the heating temperatures of the two or more press roll units 3121*b* may be set to be progressively increased in the transfer direction of the web 510, and the gaps between each pair of upper and lower rolls in the two or more press roll units 3121*b* may be set to be progressively narrowed in the transfer direction of the web 510. By this, the web 510 is pressed and cured to a predetermined thickness while continuously passing through the two or more press roll unit 3121*b* of the rolling curing unit 312.

As illustrated in FIGS. 6-8, the cooling unit 313 includes two or more cooling chambers 3131, each separately disposed in the transfer direction of the oxidized carbon precursor fiber web 510, and the cooling chambers 3131 are configured to allow each cooling air to be supplied and thus the heated web 510 is slowly cooled while passing each cooling chamber 3131.

Hereinafter, the present invention will be described in detail with reference to Examples, but the present invention is not limited thereto.

Example 1

About 90% by weight of an oxidized PAN-based staple fibers (Manufacturer: Zoltek Corporation, Model name: PYRON®) with a carbon content of about 62%, a density of about 1.3 g/cc, a crimp level of 3 turns/cm, and a fiber length of about 60 mm as oxidized carbon precursor staple fibers and about 10% by weight of PVA staple fibers (Manufacturer: Kuraray, Model name: Kuralon) with a fiber length of about 12 mm as binder staple fibers were uniformly mixed. A fiber opening/mixing treatment, a carding treatment, a crosslapping treatment, a binding treatment by needle-punching, a heat-press treatment for performing calendaring at a pressure of about 3 kgf/cm$^2$, and a winding treatment were performed by using this staple fiber mixture to form an oxidized carbon precursor fiber preweb including about 90% by weight of oxidized PAN-based staple fibers and about 10% by weight of PVA staple fibers. An impregnation process, a curing process, and a carbonization process were performed on the thus-obtained oxidized carbon precursor fiber preweb by using the system shown in FIG. 6 to prepare a carbon substrate, for a gas diffusion layer without performing an oxidation process.

Here, in the impregnation process, the oxidized carbon precursor fiber preweb was impregnated with a slurry prepared by mixing a phenolic resin solution (weight average molecular weight: about 3,000 to about 5,000, solvent: N-methyl-2-pyrrolidone) and graphite particles (Manufacturer: ASBURY Carbons, Model name: 5991) (the weight ratio of the phenolic resin to the graphite particles=50/50, the solids content of the mixture=about 20% by weight) with an impregnating amount of about 3 mg solids/cm$^2$ of the preweb. The curing process was performed in a manner that the temperature of the heating belt 3111a was set to be at about 120° C., and three press roll units 3121a, whose temperatures were progressively increased from about 130° C. to about 150° C. and to about 180° C., were used for drying and curing the oxidized carbon precursor fiber web. The temperature of the cooling chamber 3131 was controlled to be at about 30° C. or less by cooling air. In the carbonization process, a carbonization treatment was performed in a carbonization furnace (not shown) at about 1000° C. for about 30 min while nitrogen or argon was introduced at an flow rate of about 10 l/min and a graphitization treatment was performed in a graphitization furnace (not shown) at about 2000° C. for about 30 min while nitrogen or argon was introduced at a flow rate of about 10 l/min to obtain a carbon substrate with properties described in Example 1 of Table 1. The transfer speed of the oxidized carbon precursor fiber web in the impregnation, curing, and carbonization processes was about 3 m/min.

Example 2

An experiment was performed in the same manner as in the method used in Example 1 to obtain a carbon substrate with properties described in Example 2 of Table 1, except that about 70% by weight of the oxidized PAN-based staple fiber as oxidized carbon precursor staple fibers and about 30% by weight of the PVA staple fibers as binder staple fibers were used.

Example 3

An experiment was performed in the same manner as in the method used in Example 1 to obtain a carbon substrate with properties described in Example 3 of Table 1, except that about 90% by weight of the oxidized PAN-based staple fiber as oxidized carbon precursor staple fibers and about 10% by weight of a polyester staple fibers with a low melting point (LM polyester staple fibers) of about 130° C. as binder staple fibers were used.

Comparative Example

100% by weight of a PAN staple fiber (Manufacturer: Bluestar, Model name: Tow 320K) with a diameter of about 50 μm to about 60 μm, a tensile strength of about 10 g/d, and a breaking strength of about 2.2 g/d as carbon precursor staple fibers was used to form a carbon precursor fiber preweb. In addition, an experiment was performed in the same manner as in the method used in Example 1 to obtain a carbon substrate with properties described in Comparative Example of Table 1, except that the carbon precursor fiber preweb was oxidized in an air atmosphere at about 300° C. to about 400° C. for 1 hour, prior to the impregnation, curing, and carbonization processes in a carbon substrate preparation process.

TABLE 1

| Category | Example 1 | Example 2 | Example 3 | Comparative Example |
|---|---|---|---|---|
| Thickness | 400 ± 30 μm No deviation in thickness in MD and CD directions | 400 ± 30 μm No deviation in thickness in the MD and CD directions | 400 ± 50 μm No deviation in thickness in the MD and CD directions | 400 ± 120 μm More deviation in the CD direction than in the MD direction |
| Substrate Shape | The components of the substrate were uniformly distributed over the entire surface of the obtained substrate. The planarity of the substrate was good. | The components of the substrate were uniformly distributed over the entire surface of the obtained substrate. The planarity of the substrate was good, but, some portions of the substrate had slight indentations. | The components of the substrate were uniformly distributed over the entire surface of the obtained substrate. The planarity of the substrate was good. | The components of the substrate were irregularly distributed, especially along the CD direction. And, the planarity of the substrate was poor. |
| Porosity (%) | 88 | 88 | 93 | 88 |
| Electrical resistance (In-plane) mΩ-cm | 20 | 50 | 50 | 15 |
| Electrical resistance (Thru-plane) mΩ-cm | 8 | 20 | 20 | 6 |

TABLE 1-continued

| Category | Example 1 | Example 2 | Example 3 | Comparative Example |
|---|---|---|---|---|
| Rate of press (%)(@Pressure of 100 N/cm$^2$) | 90 | 89 | 72 | 85 |
| Bending angle(°) | 45 | 45 | 30 | 30 |
| Property description | Although PVA staple fibers are carbonized and turned into carbon fibers to have a binding force, the rates of press are increased due to a low strength of the carbon fibers made from PVA staple fibers and the electrical resistance is increased with an increase in PVA contents. | | Most of the LM polyester staple fibers were turned into gas and ash forms during the carbonization process without being turned into carbon fibers, thus increasing the porosity and lowering the binding force of the substrate, making the electrical resistance increased. During bending, they were easily broken due to their brittle properties | Because the mechanical strength of the obtained substrate is maintained only by carbon fibers made from PAN staple fibers, a high rate of press and brittle properties were shown. However, the electrical resistance was low and the electrical conductivity was high. |

In Table 1, the porosity was measured using mercury intrusion porosimetry under the conditions and method defined in ASTM D4404. Electrical resistance (in-plane) and electrical resistance (thru-plane) were measured under the conditions and method defined in ASTM C611. Rate of press was measured under the conditions and method defined in ASTM D645. Bending angle is a measure of bending stiffness and was measured under the conditions and method defined in ASTM D5650.

Figure 9:
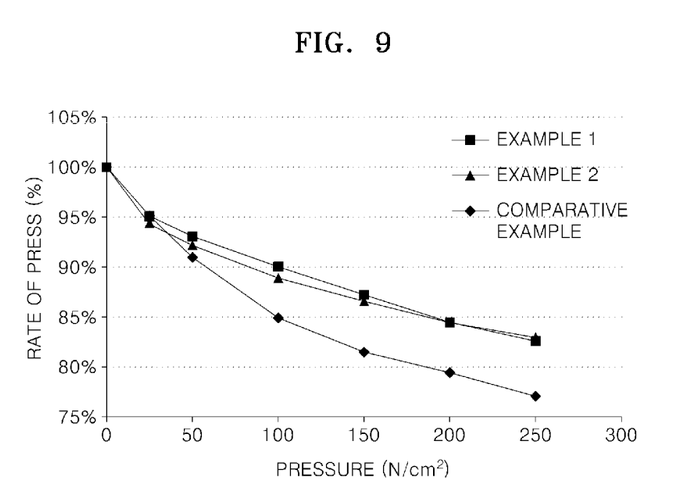
FIG. 9 is a graph illustrating press curing properties of carbon substrates obtained in Examples of the present invention and a Comparative Example.

The rates of press of the obtained carbon substrates in Examples 1 and 2 and the Comparative Example are shown in FIG. 9. As shown in FIG. 9, it is observed that the rates of press of the carbon substrate in the Examples according the present invention were excellent, compared to the rate in the Comparative Example.

Accordingly, when methods and systems for preparing a carbon substrate of the present invention, in which an oxidation treatment process is skipped and a carbon substrate is formed continuously through a multi-step rolling curing process, are used, problems of deviation and low processability of a carbon substrate product can be solved.

Therefore, the present invention may achieve the following technical effects by utilizing a combination of carbon precursor staple fibers in an oxidized form with low ductility and high stiffness as carbon precursor staple fibers; and binder staple fibers composed of a polymer resin which is excellent in terms of ductility and binding force and has a melting point of about 300° C. or less.

1) Typical non-woven fabric preparation processes may be used as they are.

2) Since the deviation of a carbon web by elongation is small, elongation control properties in the machine direction (MD)/cross-machine direction (CD) are excellent, and deviations in local thickness and weight of an obtained carbon substrate are low. Thus, it is easy to control the resin impregnation process, and it is possible to achieve uniform resin impregnation and control the thickness.

3) Since carbon precursor staple fibers in an oxidized form with lower ductility and higher stiffness are used, the mechanical strength of the carbon substrate made therefrom is high.

4) Since binder staple fibers are used, a thin carbon substrate with a thickness of about 300 μm or less may be prepared.

5) Since standardized carbon precursor staple fibers in an oxidized form are used from a carbon fiber production line, no oxidation treatment process is required and raw material properties are constant.

6) In the subsequent process of preparing electrodes and membrane electrode assemblies (MEAs), 3-dimensional binding and elasticity properties of a non-woven carbon substrate may be fully used.

In addition, a carbon substrate of the present invention may be continuously manufactured through a multi-step rolling curing process for pressing and curing an oxidized carbon precursor fiber web with a rolling curing unit having two or more pairs of press rolls.

As a result, the workability may be enhanced, and the thickness of the carbon substrate may be uniformly maintained due to pressing by a plurality of rolls with a fixed gap therebetween.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, embodiments disclosed in the present invention are not intended to limit the technical spirit of the invention, but are intended to describe the technical spirit. The technical scope of the present invention is not limited by the embodiments. Furthermore, it should be understood that the scope of the present invention is interpreted by the accompanying claims, and all technical aspects within a range of equivalents thereof belong to the scope of the present invention.

What is claimed is:

1. A method of preparing a carbon substrate for a gas diffusion layer of a polymer electrolyte type fuel cell, the method comprising:
   forming an oxidized carbon precursor fiber preweb comprising oxidized carbon precursor staple fibers and binder staple fibers;
   impregnating the oxidized carbon precursor fiber preweb with a slurry including a thermosetting resin and carbonaceous fillers and drying the resulting preweb to obtain an oxidized carbon precursor fiber web;
   applying heat and pressure to the oxidized carbon precursor fiber web, which has been impregnated with the thermosetting resin and the carbonaceous fillers, to cure the thermosetting resin and press the oxidized carbon precursor fiber web;
   a carbonization process including heating the oxidized carbon precursor fiber web in an inert atmosphere, thereby stabilizing and carbonizing the oxidized carbon precursor staple fibers to obtain a carbon substrate
   wherein the step of forming an oxidized carbon precursor fiber preweb comprises:
   uniformly mixing and loosening lumps of oxidized carbon precursor stale fibers and the lumps of binder staple fibers, and disentangling them;
   arranging the oxidized carbon precursor staple fibers and the binder staple fibers in parallel and collecting them to form the oxidized carbon precursor fiber preweb in a sheet shape;
   stacking the oxidized carbon precursor fiber preweb into a plurality of layers to obtain an oxidized carbon precursor fiber preweb with a desired weight;
   bonding the oxidized carbon precursor staple fibers and the binder staple fibers by allowing them to be mechanically entangled with eachother by needle-punching to bind the oxidized carbon precursor fiber preweb;
   heat-pressing the oxidized carbon precursor fiber preweb thus-bound by calendaring the preweb;
   winding the oxidized carbon precursor fiber preweb.

2. The method of claim 1, wherein the binder staple fibers are present in an amount of 1 to 30% by weight based on a weight of the preweb, and are a thermoplastic polymer staple fiber with a melting point of 300° C. or less.

3. The method of claim 1, wherein the curing process is performed by a multi-step rolling curing process comprising a preheating step, a heat-press curing step, and a cooling step.

4. The method of claim 3, wherein the multi-step rolling curing process comprises:
   the preheating step including preheating the oxidized carbon precursor fiber web, which has been impregnated with the thermosetting resin and the carbonaceous fillers, while it is being transferred at 100° C. to 150° C.;
   the heat-press curing step including pressing and curing the oxidized carbon precursor fiber web, while it is being transferred, at 130° C. to 250° C. by a rolling curing unit having two or more pairs of rolls whose rolling gaps formed to be progressively narrowed in the transfer direction of the oxidized carbon precursor fiber web; and
   the cooling step including air-cooling the oxidized carbon precursor fiber web which has been pressed and cured to a predetermined thickness through the continuous rolling curing process.

5. The method of claim 4, wherein the preheating step is performed by sequential heating at a temperature of two or more different stages within a range of 100° C. to 150° C.

6. The method of claim 4, wherein in the heat-press curing step, the oxidized carbon precursor fiber web is heated and pressed while continuously passing through at least two pairs of rolls of the rolling curing unit in a manner in which the oxidized carbon precursor fiber web passes through a first pair of rolls having a gap of 300 µm to 1000 µm at 130° C. to 250° C., subsequently passes through a second pair of rolls having a gap of 250 µm to 600 µm at 130° C. to 250° C., and then passes through a $n^{th}$ pair of rolls (n is a natural number of 3 or more and 10 or less) having a gap of 200 µm to 400 µm at 130° C. to 250° C.

7. The method of claim 4, wherein the cooling step is performed in a manner in which the oxidized carbon precursor fiber web heated in the heat-press curing step is sequentially cooled in two or more stages to be slowly cooled.

8. The method of claim 1, wherein the carbonization process comprises:
   a carbonization step for heating the oxidized carbon precursor fiber web in an inert atmosphere at 600° C. to 1000° C. to carbonize the oxidized carbon precursor staple fibers, the thermosetting resin, and the binder staple fibers; and
   a graphitization step for further heating the carbonized web in an inert atmosphere at 1300° C. to 2000° C. to form a graphite structure in the carbon fibers which has been formed by the carbonization.

9. The method of claim 1, wherein the oxidized carbon precursor staple fibers are at least one selected from the group consisting of oxidized PAN-based staple fibers, oxidized pitch-based staple fibers, oxidized PVA-based staple fibers, oxidized cellulose-based staple fibers, and oxidized phenolic resin-based staple fibers,
   and the binder staple fibers are at least one selected from the group consisting of PVA staple fibers, LM polyester staple fibers, PE staple fibers, PP staple fibers, cellulose staple fibers, and pitch staple fibers.

* * * * *